Dec. 7, 1937.     H. C. LORD ET AL     2,101,078
FLEXIBLE COUPLING
Filed July 10, 1935     2 Sheets-Sheet 1

INVENTORS
Hugh C. Lord
and Thomas Lord
BY
T. R. Lord
ATTORNEYS.

Dec. 7, 1937.  H. C. LORD ET AL  2,101,078

FLEXIBLE COUPLING

Filed July 10, 1935   2 Sheets-Sheet 2

INVENTOR.
Hugh C. Lord
and Thomas Lord
BY H. L. Lord
ATTORNEYS.

Patented Dec. 7, 1937

2,101,078

UNITED STATES PATENT OFFICE 2,101,078

FLEXIBLE COUPLING

Hugh C. Lord and Thomas Lord, Erie Pa.; said Thomas Lord assignor to said Hugh C. Lord Application July 10, 1935, Serial No. 30,653

12 Claims. (Cl. 64—13)

This invention is designed to simplify and improve flexible couplings, and in a general way is an improvement of the flexible coupling disclosed in the patent of H. C. Lord, #1,820,750, dated August 25, 1931.

The present invention gives greater flexibility, has a wider range of adaptability, and may be made more economically than the prior structure. Features and details of the invention will further appear in the specification and claims.

Preferred embodiments of the invention are illustrated in the accompanying drawings, as follows.

Figure 1:
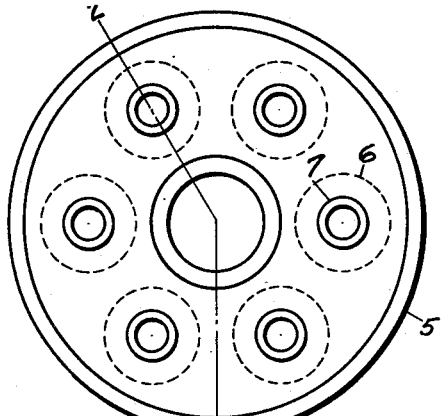
Fig. 1 shows an elevation of a coupling plate having six yielding joints.
Figure 2:
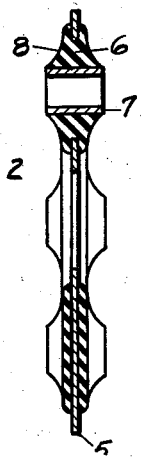
Fig. 2 is a section of the line 2—2 in Fig. 1.
Figure 3:
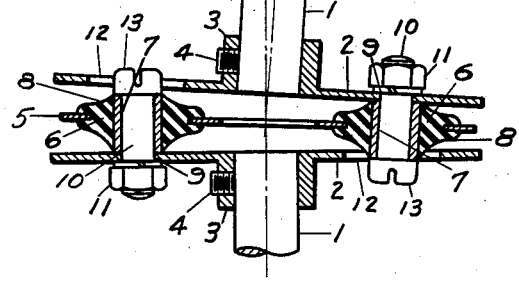
Fig. 3 is a section of the line 3—3 in Fig. 4, showing a completed coupling, showing the coupling elements misaligned.
Figure 4:
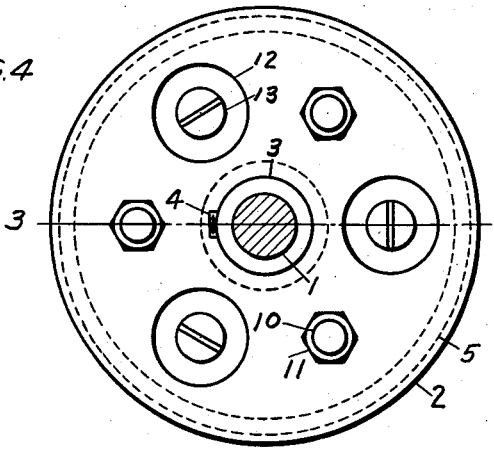
Fig. 4 is a side elevation of the coupling illustrated in Fig. 3.
Figure 5:
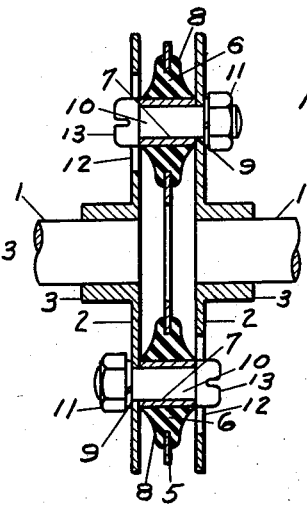
Fig. 5 is a view similar to Fig. 3, with the coupling elements in alignment.
Figure 6:
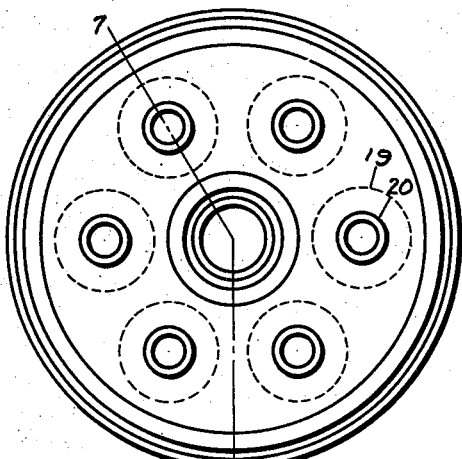
Fig. 6 is an elevation of a coupling member having six flexible joints and three coupling plates.
Figure 7:
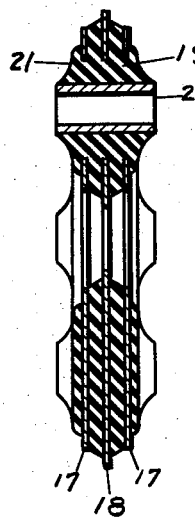
Fig. 7 is a section of the line 7—7 in Fig. 6.
Figure 8:
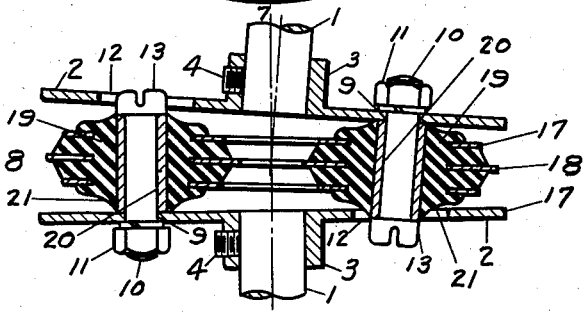
Fig. 8 is a section of the line 8—8 in Fig. 9 of a completed coupling with the coupling elements misaligned.
Figure 9:
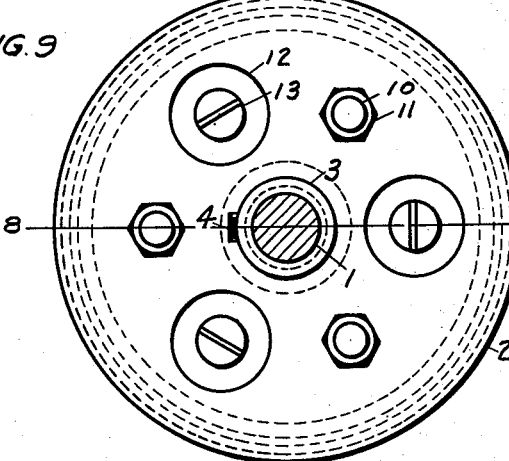
Fig. 9 is a side elevation of the coupling illustrated in Fig. 8.
Figure 10:
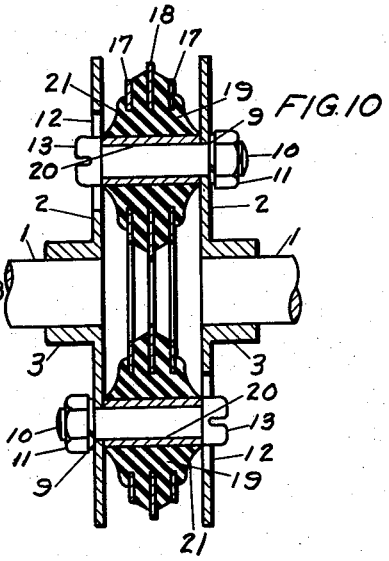
Fig. 10 is a section similar to Fig. 8, but with the coupling elements in alignment.

1—1 mark rotating shafts, either of which may be the drive or driven shaft. Coupling flanges 2 have hubs 3 which are fixed on the shafts by set screws 4.

A coupling member, in Figs. 1 to 5, a single plate 5 is arranged between the flanges 2—2. This coupling plate is provided with openings 6 preferably equally spaced from each other and the center of the plate. Inner members 7 are arranged in the openings 6, and rubber elements 8 bridge the space from the edges of the openings 6 to the inner members 7. These rubber elements overlap the faces of the plate adjacent to the edges of the openings, and are secured by a surface union, preferably by bonding during vulcanization to the faces of the plate and the surface of the inner member.

Openings 9 are provided in the flanges 2, and bolts 10 extend through these openings and the inner members 7, and are tightened in place by nuts 11, which clamp the inner members to the faces of the flanges. Alternate joints are secured to opposite flanges, and there is provided in the flanges opposite each opening 9 an opening 12 large enough to permit the head 13 of the bolt 10 to move freely in the opening.

With any misalignment, the joints yield in sheer, half the movement being accommodated with the joints secured to one flange, and half the movement being accommodated by the joints secured to the other flange.

In Figs. 6 to 10 a somewhat similar coupling is illustrated. It is provided with the same shafts and flanges. The coupling member is made up of two outside plates 17 and one center plate 18, these plates being spaced apart axially, but arranged concentrically. Each plate is provided with an opening 19. Inner members 20 extend through the openings in the three plates and rubber elements 21 bridge the space between the edges of the openings in the plates and the inner member. The rubber element overlaps the faces of the plates at the edges of the openings, and is secured to the plates and to the central member preferably by a surface union and preferably by bonding during vulcanization.

The coupling member is secured in the coupling in the same manner as is the coupling member in the structure shown in Fig. 1.

By pluralizing the plates, couplings of very much greater driving power than the couplings illustrated in Fig. 1 may be provided. The misalignment is accommodated by the rubber in sheer in the space between the inner member and the edges of the plates, and there is a slight relative movement of the plates to ease the movement.

In this manner a large volume of rubber may be introduced to carry the load and the bonded surfaces on the plates are multiplied so as to add to the strength of the structure. Further, the resistance to sidewise pressure at the edges of the openings is strengthened by the rubber wall between the plates.

It will be noted that the resilient elements of the joint are united with the central member as the resilient element is formed. Thus the plurality of joints are directly fabricated with, and united to, the member. This cheapens the manner of assembly and reduces the parts, thus reducing weight, and also reducing the tendency to produce unbalanced conditions.

What we claim as new is:

1. In a flexible coupling, the combination of two rotating members spaced axially, one of the members having a joint, comprising a plate with an opening therethrough offset from the axis of the coupling, and an element of resilient material overlapping the plate at the edges of the opening, and secured to the overlapping surface by a surface union, said element projecting into free space within the opening, and being secured at a point spaced from the edges of the opening to the companion member.

2. In a flexible coupling, the combination of two rotating members spaced axially, one of the members having a joint comprising a plate with an opening therethrough offset from the axis of the coupling and an attaching member within the opening and an element of resilient material overlapping the plate at the edges of the opening and secured to the overlapping surface and to the attaching member by a surface union, said element projecting into free space between the edge of the opening and the attaching member, said attaching member being secured to the companion rotating member.

3. In a flexible coupling, the combination of two rotating members spaced axially, one of the members being in the form of a plate having an opening therethrough offset from the axis of the coupling, and an element of resilient material overlapping the plate at the edges of the opening, and secured to the overlapping surface by a surface union, said element projecting into free space within the opening and being secured at a point spaced from the edges of the opening to the companion member.

4. In a flexible coupling, the combination of two rotating members spaced axially; an intermediate member between the rotating members, said intermediate member comprising a plurality of joints, the intermediate member having an opening therethrough for each joint offset from the axis of the coupling and an element of resilient material overlapping the intermediate member at the edges of the opening, and secured to the overlapping surface by a surface union, said element projecting into free space within the opening and one of said elements being secured to one of the rotating members, and the other of said elements being secured to the other of said rotating members at points spaced from the edges of the openings.

5. In a flexible coupling, the combination of two rotating members spaced axially; an intermediate member in the form of a plate between the rotating members, said plate having a plurality of openings therethrough; attaching members arranged at the openings and elements of resilient material overlapping the plate at the edges of the openings and secured to the overlapping surface and to the attaching members by a surface union, said element bridging the space between the edges of the openings and the attaching members; and means securing one attaching member to one rotating member, and the other attaching member to the other rotating member.

6. In a flexible coupling, the combination of two rotating members spaced axially, one of the members having a joint offset from the axis comprising a plurality of spaced plates with superimposed openings therethrough and an element of resilient material overlapping the plates at the edges of the openings and secured thereto by a surface union, said element projecting into free space within the opening and being secured at a point spaced from the edges of the openings to the companion member.

7. In a flexible coupling, the combination of two rotating members spaced axially, one of the members having a joint offset from the axis and comprising a plurality of spaced plates with superimposed openings therethrough, an attaching member within the openings, and an element of resilient material overlapping the plates at the edges of the openings and secured thereto and to the attaching member by a surface union, said element bridging the space between the edges of the openings and the attaching member; and means securing the attaching member to the companion member.

8. In a flexible coupling, the combination of two rotating members spaced axially; an intermediate member between the rotating members, comprising a plurality of plates, having a plurality of superimposed openings therein and an element of resilient material for each series of openings overlapping the plates at the edges of the openings and secured thereto by a surface union, said elements projecting into free space within the openings, said elements being secured at points spaced from the edges of the openings, one element to one rotating member and the other element to the other rotating member.

9. In a flexible coupling, the combination of two rotating members, spaced axially; an intermediate member between the rotating members, comprising a plurality of plates having a plurality of superimposed openings therein; an attaching member within each series of openings; an element of resilient material for each series of openings overlapping the plates at the edges of the openings and secured thereto and to the attaching members by a surface union, said elements bridging the space between the edges of the openings and the attaching plates; and means securing the attaching member, one to the one rotating member and the other to the other rotating member.

10. In a flexible coupling, the combination of two rotating members spaced axially, one of the members having a joint comprising a plate with an opening therethrough, and an element of resilient material overlapping the plate at the edges of the opening and secured to the overlapped surface by a surface union, said element projecting into free space within the opening and being secured at a point spaced from the edges of the opening to the companion member.

11. In a joint, a plurality of plates, each plate having an opening through it, the plates being spaced apart, and the opening in one plate being superimposed over the opening in the other plate; an element of resilient material overlapping the plates at the edges of the openings and secured by a surface union to the overlapped surfaces, said element projecting into free space within the opening.

12. In a joint, a plurality of plates, each plate having an opening through it, the plates being spaced apart, and the opening in one plate being superimposed over the opening in the other plate; an element of resilient material overlapping the plates at the edges of the openings and secured by a surface union to the overlapped surfaces, said element projecting into free space within the opening; and an attaching member permanently secured to the element within the projected area of the opening.

HUGH C. LORD.
THOMAS LORD.